United States Patent [19]

Houdard et al.

[11] Patent Number: 4,507,747

[45] Date of Patent: Mar. 26, 1985

[54] PROCEDURE FOR SHARED-TIME PROCESSING OF DIGITAL SIGNALS AND APPLICATION TO A MULTIPLEXED SELF-ADAPTING ECHO CANCELER

[75] Inventors: Jean-Pierre Houdard; Philippe F. Patte, both of Colombes, France

[73] Assignee: Le Materiel Telephonique Thomson-CSF, Colombes, France

[21] Appl. No.: 457,942

[22] Filed: Jan. 14, 1983

Related U.S. Application Data

[63] Continuation of Ser. No. 181,667, Aug. 26, 1980, abandoned.

[30] Foreign Application Priority Data

Aug. 30, 1979 [FR] France ............................ 79 21769

[51] Int. Cl.[3] .......................................... G06F 15/31

[52] U.S. Cl. ............................ 364/724; 343/5 DP

[58] Field of Search ...................... 364/724; 375/34; 455/307; 179/1 P; 343/5 DP

[56] References Cited

U.S. PATENT DOCUMENTS 3,967,102 6/1976 McCown ........................ 364/724

FOREIGN PATENT DOCUMENTS 2272544 12/1975 France .

OTHER PUBLICATIONS

Jones et al., "A Time-Shared Digital Filter Realization" *IEEE Trans. on Computers,* vol. C-18, No. 11, Nov. 1969, pp. 1027–1031.

*Primary Examiner*—David H. Malzahn

*Attorney, Agent, or Firm*—Oblon, Fisher, Spivak, McClelland & Maier

[57] ABSTRACT

A self-adapting digital filter having one or more processing modules each possessing a delayed discrete value memory, a coefficient memory, two multipliers-accumulators, a variable-amplitude shift register and a summing circuit with the delayed discrete value memories being addressed in a manner producing fictive shifting of their contents.

6 Claims, 3 Drawing Figures

PROCEDURE FOR SHARED-TIME PROCESSING OF DIGITAL SIGNALS AND APPLICATION TO A MULTIPLEXED SELF-ADAPTING ECHO CANCELER

This is a continuation of application Ser. No. 181,667, filed Aug. 26, 1980, now abandoned.

BACKGROUND OF THE INVENTION

1. Field of the Invention

The present invention relates to a procedure for the self-adapting processing of digital signals and its application to a multiplexed self-adapting echo canceler, especially for passing through digital telephone exchanges and for long-distance telephone connections.

2. Description of the Prior Art

When a 4-wire circuit in a telephone transmission channel is connected to a 2-wire circuit, the change from the 4-wire mode to the 2-wire mode is made by means of a terminator. This terminator is a hybrid network or a bridge circuit, with or without a transformer, which in practice results in rather approximate separation between the outgoing and incoming signals.

The elimination of signals reflected by the 4-wire/2-wire terminator by means of an adaptive echo canceler is satisfactory, but echo cancelers operating in accordance with presently known digital signal processing procedures are very costly and voluminous, especially if they are multiplexed.

The purpose of the present invention is to propose a new digital signal processing procedure allowing the shared-time processing over a large number of channels in a dependable manner.

The present invention also relates to a digital filter, in particular an echo canceler for embodiment of the said procedure, this echo canceler producing practically zero attenuation of signals passing through 2-wire digital telephone exchanges and almost completely eliminating echo when used for long-distance telephone connections, this echo canceler having the least possible size and the lowest possible cost.

SUMMARY OF THE INVENTION

The processing procedure in accordance with the present invention makes it possible to synthesize from an incident signal a digital signal as close as possible to the "operand" digital signal (i.e. the signal which is compared with the synthesized signal in the case of application to an echo suppressor, and the signal which is compared with an ideal signal in the case of application to a digital equalizer), with respect to which a difference signal is produced, this procedure consisting for each channel processed in memorizing a series of consecutive digital samples, the number of samples being determined from said incident signal, linearly transcoded to digital form if required, in multiplying upon arrival of a first considered sample of the incident signal coming immediately after the most recent sample of said series, the oldest samplest of said series by the value of the previously produced error signal sample, in multiplying the result of this multiplication by a corrective factor depending on the ratio of the levels of said incident signal and said "operand" digital signal of the channel considered, in adding the result of this second multiplication to the first coefficient of a series of coefficients corresponding to said series of samples, the result of this addition providing a new coefficient which is substituted for said first coefficient, in multiplying the value of the sample immediately following said oldest sample by said result of addition, in memorizing the result of this last multiplication, in repeating this process for all the other samples of said series of samples taken in the order of decreasing age by adding each time the result of the last multiplication of the process considered to the result memorized during the previous process and by memorizing the sum of these two results, and, having obtained for the last or most recent sample of said series the final sum of the result of the last multiplication and of the memorized sum of the results of all the last multiplications, in producing an error signal sample equal to the difference between this final sum and the corresponding sample of the channel corresponding to the "operand" digital signal, this error signal sample being memorized for subsequent use upon arrival of the sample immediately following said first sample considered of the incident signal, in writing said first sample considered in place of the oldest sample of said series, in repeating the same procedural stages for each channel to be processed, and, upon completion of the processing of the last channel, in repeating channel by channel the same stages from the arrival of an incident signal sample occurring immediately after said corresponding first sample considered.

According to another aspect of the procedure proposed by the present invention, several adjacent series are memorized for each channel processed, all comprising the same number of consecutive digital samples, the oldest sample of the first series immediately succeeding (more recent than) the most recent sample of the second series whose oldest sample immediately succeeds the most recent sample of the third series, and so on up to the last series, and then the different adjacent series are simultaneously processed for each channel in accordance with the stages of the procedure described above, and, for obtaining the error signal sample of each channel, said final sums are added and the difference between the total of these final sums and the sample corresponding to the channel corresponding to the "operand" digital signal is determined, and following production of the error signal sample, the oldest sample of the next-to-last series is written in place of the oldest sample of the last series, the oldest sample of the series immediately before the next-to-last series is written in place of the oldest sample of the next-to-last series, the procedure being the same for the other series until reaching the first series in which said first sample considered is written in place of the oldest sample which had formerly been written in place of the oldest sample of the second series.

The digital filter embodying the procedure proposed by the present invention comprises a convergence or correction control signal generating circuit and a processing circuit whose input is connected to a terminal receiving the samples of the linear digital signal to be processed and whose output is connected to the input of a subtract circuit whose other input is connected to a terminal receiving the digital samples in linear form of the "operand" signal, of which it produces the difference with respect to the samples corresponding to the signal to be processed, an inverter whose first input is connected to the output of the subtract circuit, whose second input is connected to said terminal receiving the digital samples in linear form of the "operand" signal and whose output is connected to the output channel of the filter, an error signal memory whose input is connected to the output of said subtract circuit and whose output is connected to the error signal input of the processing circuit, and, in accordance with the main characteristic of the present invention, the processing circuit comprises a processing module including a delayed discrete value memory whose output is connected to an input of a first multiplier-accumulator as well as to an input of a second multiplier-accumulator, the second input of the second multiplier-accumulator being connected to the output of said error signal memory, a shift register whose input is connected to the output of said second multiplier-accumulator whose output is connected to a first input of a summing circuit, and a coefficient memory whose input is connected to the output of said summing circuit and whose output is connected to the second input of the summing circuit, the second input of the first multiplier-accumulator being connected to the output of the summing circuit and its output being the output of the processing module.

According to another characteristic of the present invention, said processing circuit comprises several identical processing modules, the input of the delayed discrete value memory of the second module and of the following modules being each time connected to the output of the delayed discrete value memory of the preceding module, and the outputs of the various processing modules are connected to the corresponding inputs of an adder whose output constitutes the output of the processing circuit and is connected to said subtract circuit.

BRIEF DESCRIPTION OF THE DRAWINGS

The present invention is more easily understood from the detailed description of an illustrative embodiment adopted as a non-limiting example and illustrated by the appended drawings in which.

DESCRIPTION OF THE PREFERRED EMBODIMENTS

Figure 1:
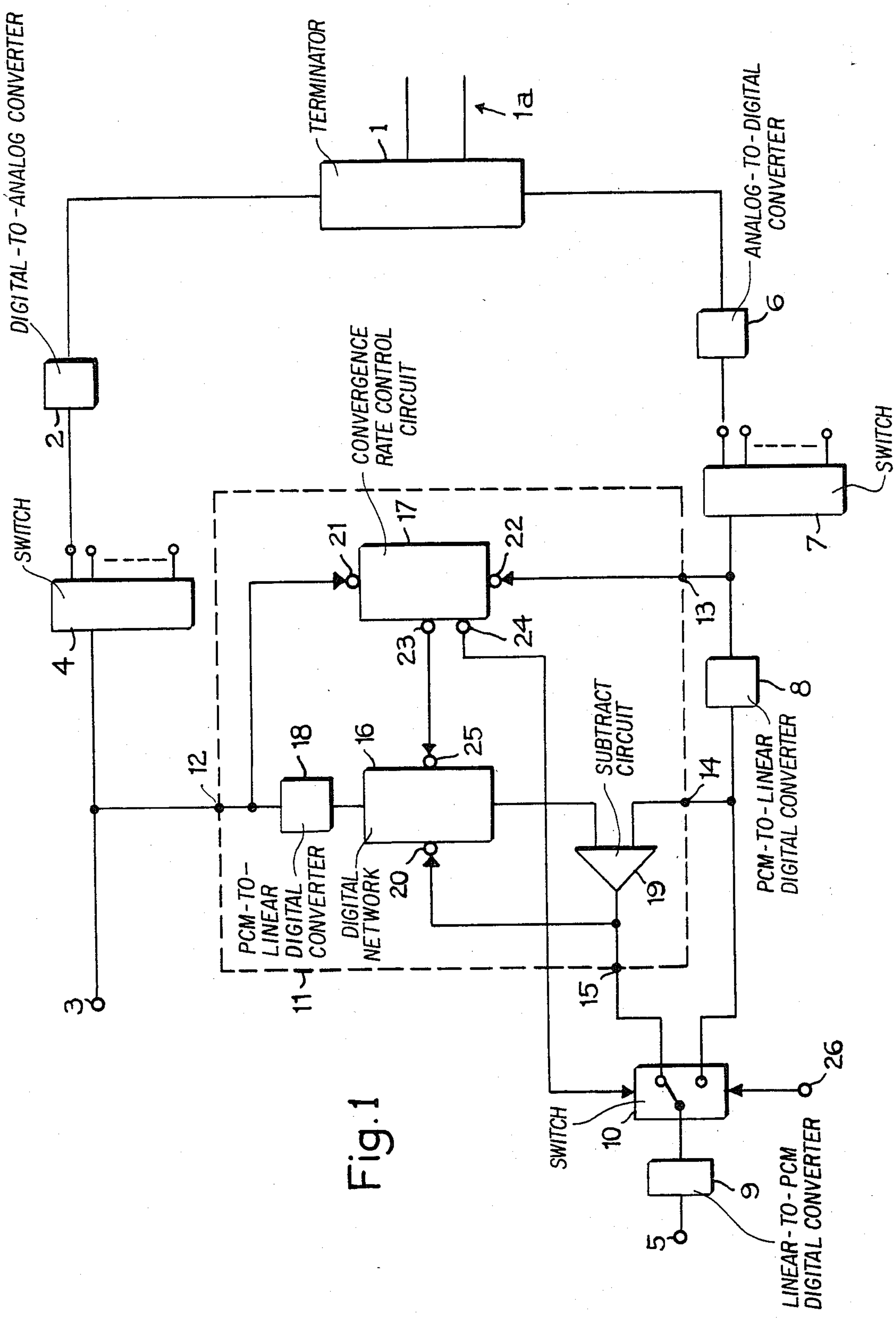
FIG. 1 is a block diagram of an echo canceler with a self-adapting nonrecursive digital filter in accordance with the invention.

Referring now to the drawings, wherein like reference numerals designate identical or corresponding parts throughout the several views, and more particularly to FIG. 1 thereof.

There is shown the block diagram of an echo canceler operating in conjunction with the terminators of a 4-wire/2-wire digital telephone exchange and comprising a self-adapting non-recursive digital filter in accordance with the invention. The filter constituting the illustrative embodiment of the procedure proposed by the invention is not, however, limited to producing an echo suppressor, but can also be applied, for example, to a self-adapting equalizer. Similarly, when considering the case of an echo canceler, the latter can as well be associated with each of the terminators of a 2-wire/2-wire digital exchange as with originating international exchange terminators for long-distance telephone connections.

In order to simplify the drawing in FIG. 1, only one terminator 1 connected to a 2-wire circuit 1*a* is shown. Terminator 1 is preceded by a digital-to-analogue converter 2 connected to the incoming terminal 3 of the receive channel of the time-multiplexed 4-wire circuit of the telephone exchange (not shown) via a switch 4. In addition, terminator 1 is connected to the outgoing terminal 5 of the transmit channel of the time-division 4-wire circuit of the same telephone exchange via, amongst other equipment, an analogue-to-digital converter 6 and a switch 7 synchronized with switch 4.

It should be understood that the echo canceler according to the invention may, as explained below, operate with time-sharing on several channels and therefore be connected to as many terminators as the number of channels it can process on a time-sharing basis. In the same manner as terminator 1, these other terminators are connected to switches 4 and 7 respectively. It should be noted that said transmission channels before switch 4 and following switch 7 are all over the same 4-wire circuit, being separated in time only, whilst between switches 4 and 7, these same channels are spatially separated, each passing through a different terminator.

It should be noted that in the application to a digital telephone exchange described herein, terminal 3 receives the data in logarithmically encoded digital form (so-called PCM modulation). It is for this reason that converter 2 performs the digital-to-analogue conversion, terminator 1 being an analogue terminator. Conversely, in order to retrieve the data in PCM digital form on terminal 5, converter 6 performs the linear analogue-to-digital conversion and then the linear digital-to-PCM conversion. Since the digital network described below is required to operate with linear digital signals, however, and since its decision logic circuit, also described below, operates preferably with PCM-encoded digital signals, a PCM-to-linear digital converter 8 is inserted between switch 7 and terminal 5, followed by a linear-to-PCM digital converter 9, a switch 10 whose purpose is explained below being inserted between converters 8 and 9, one of the fixed contacts of switch 10 being connected to the output of converter 8 and its moving contact being connected to the input of converter 9.

The echo canceler 11 possesses three input terminals 12, 13 and 14 and an output terminal 15. Input terminal 12 is connected directly to terminal 3 and is therefore fed with the PCM-encoded digital data. Input terminal 13 is connected to the line linking switch 7 to converter 8 and therefore receives PCM-encoded digital data. Input terminal 14 is connected to the output of converter 8 and therefore receives data in linear digital form. Output terminal 15 of the echo canceler is connected to the other moving contact of switch 10. Data in linear digital form therefore appear on the output terminal 15.

Echo canceler 11 comprises a non-recursive and self-adapting digital network 16 converging rate control and a decision logic circuit or a correction signal generating circuit 17. The input of digital network 16 is connected to terminal 12 via a PCM-to-linear digital converter 18. The output of the digital network 16 is connected to one input of a subtract circuit 19, whose other input is connected to input terminal 14. The output of the subtract circuit 19 is connected to output terminal 15 as well as to the difference memorization input 20 of the digital network 16.

The decision logic circuit 17 possesses two input terminals 21 and 22 and two output terminals 23 and 24. Input terminal 21 is directly connected to terminal 12 and input terminal 22 is directly connected to terminal 13. Output terminal 23 is connected to a convergence time control input 25 of the digital network 16, and output terminal 24 is connected to a first control input of switch 10 whose second control input is connected to a terminal 26.

Figure 2:
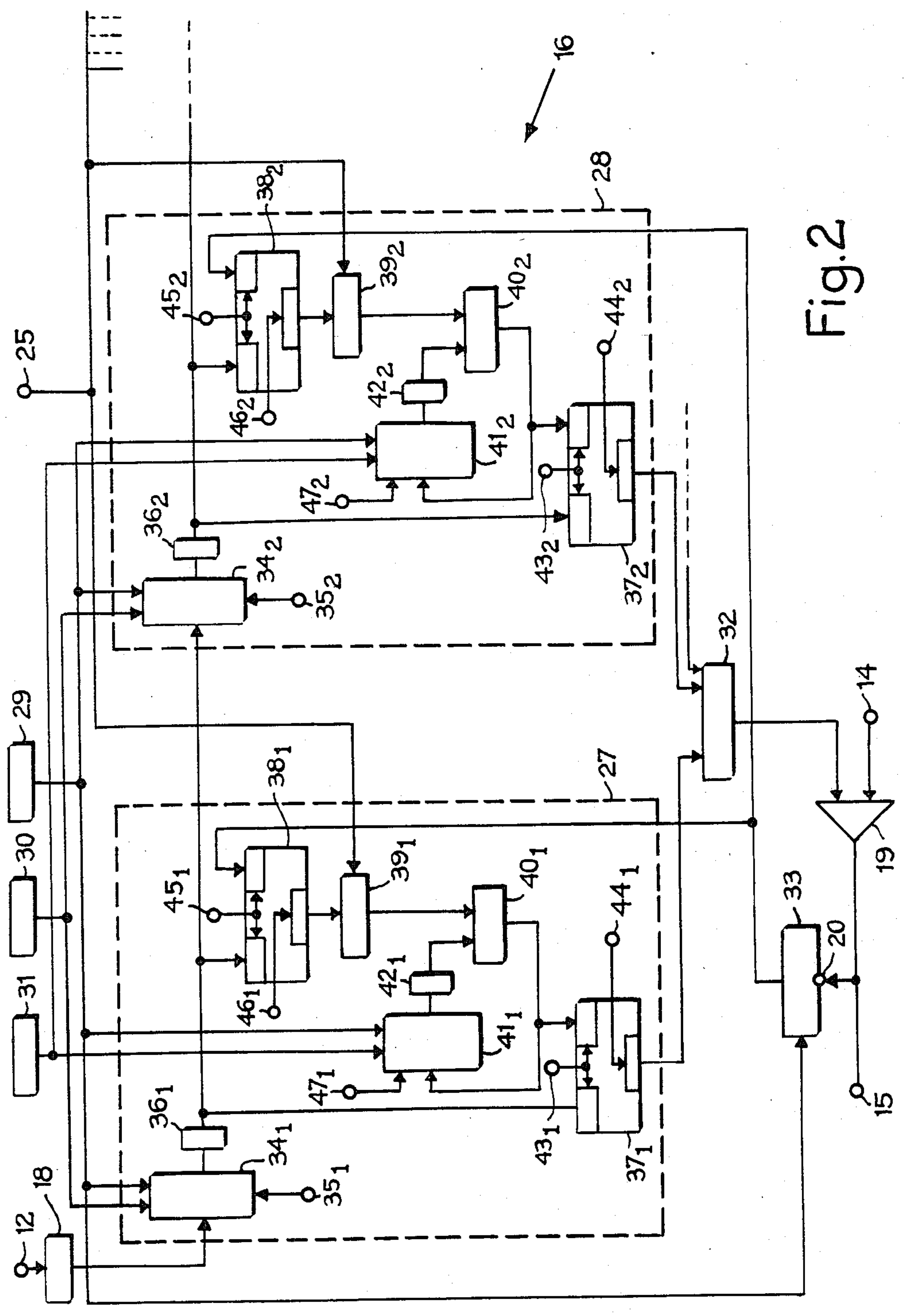
FIG. 2 is a detailed block diagram of the digital filter in FIG. 1.

FIG. 2 shows a detailed block diagram of the digital network 16 in FIG. 1. Digital network 16 comprises essentially several identical processing modules each with 16 controlled coefficients. In order to simplify the drawing, only two such modules 27 and 28 are shown, which are generally sufficient for echo elimination for a 4-wire/2-wire change in a telephone exchange. In other applications, a larger number of processing modules may be used. In the case of an international telephone exchange for long-distance connections, for example, it may be necessary to use 16 such processing modules. Digital network 16 also comprises circuits common to all the processing modules, i.e. a channel addressing counter 29 of modulo-32 in the present case, a down-counter 30 for addressing the delayed discrete value memories described below, and another down-counter 31 for addressing the coefficient memories described below. In the present case, counters 30 and 31 are modulo-16, this value corresponding to the number of words in each page of the delayed discrete value memories and, naturally, of the coefficient memories. In other applications, however, the number of memory pages, i.e. the number of channels processed on a time-sharing basis may be different. In addition, the outputs of all the processing modules are connected to the corresponding inputs of a high-speed parallel adder 32, whose output constitutes the output of digital network 16, this output consequently being connected to one of the inputs of the subtract circuit 19. Finally, a difference memory 33 is common to all the processing modules. Memory 33 is a 32-word memory, each word being assigned to one of the processed channels, and therefore addressed by counter 29. The input of memory 33 is connected to input terminal 20, and its output is simultaneously connected to all the processing modules. Memory 33 is addressed by counter 29.

The following is a description of the constitution of a processing module, for example module 27, all modules being identical. Each of the components constituting the processing modules has the same reference number in each of these modules, the suffix to this reference number being determined by the order number of the module considered. This suffix is 1 for module 27, 2 for module 28, and so on for the other modules (not shown).

The input of processing module 27 comprises a read-write memory $34_1$ directly connected to the output of converter 18 from which it is fed with the successive digital in the form of a linear multiplexed signal appearing on terminal 3 (see FIG. 1). The different pages of memory $34_1$ are addressed by counter 29, and the different words in each page are addressed by counter 30. In the example described herein, the read-write memory $34_1$ comprises 32 pages with 16 memory locations in each, but it is also possible to use memories having different capacities. Memory $34_1$ comprises a write order input $35_1$ connected to a sequential order device (not shown) ordering as described the writing of incident samples into memory $34_1$. The output of memory $34_1$ is connected via a buffer register $36_1$, which can possibly be incorporated in said memory, to the operand input of a first multiplier-accumulator $37_1$, to the operand input of a second multiplier-accumulator $38_1$ and to the input of the delayed discrete value memory of the next processing module, i.e. memory $34_2$ of module 28.

The operator input of the second multiplier-accumulator $38_1$ is connected to the output of memory 33. The output of the second multiplier-accumulator $38_1$ is connected via a shift register $39_1$ to the first input of an adder $40_1$. The shift control input of shift register $39_1$ is connected to terminal 25, and an appropriate signal applied to terminal 25 allows right-shifting of the contents of register $39_1$, depending on the number of shifts which varies with the value of this signal. This shift of m steps may be either zero or vary between 1 and n, which is equivalent to dividing the contents of register $39_1$ by $2^m$. In the application described herein, $n=32$.

Processing module 27 comprises a second read-write memory $41_1$ for memorizing the controlled coefficients relating to the various delayed discrete values processed by the corresponding processing module. Memory $41_1$ possesses as many pages and as many words per page as memory $34_1$. The different pages of memory $41_1$ are addressed by counter 29, and the different words of each page are addressed by counter 31. The input of memory $41_1$ is connected to the output of adder $40_1$ and its output is connected to the second input of adder $40_1$ via a buffer register $42_1$. The output of adder $40_1$ is also connected to the operator input of the first multiplier-accumulator $37_1$ whose output, which constitutes the output of processing module 27, is connected to the corresponding input of adder 32.

Each of multipliers-accumulators $37_1$ and $38_1$, which may be TRW type 1010J integrated circuits for example, comprises two input registers (for the operand and operator) and an output register. The input register clocking signal inputs, connected together, and the output register clocking input for multiplier-accumulator $37_1$ are connected to terminals $43_1$ and $44_1$ respectively, and the corresponding clocking signal inputs for multiplier-accumulator $38_1$ are connected to terminals $45_1$ and $46_1$ respectively. Terminals $43_1$ to $46_1$ are connected to the corresponding outputs of said sequential control circuit (not shown), producing the clock signals in the manner described below. Similarly, the control input $47_1$ for writing into memory $41_1$ is connected to a corresponding output of this same sequential control circuit.

Figure 3:
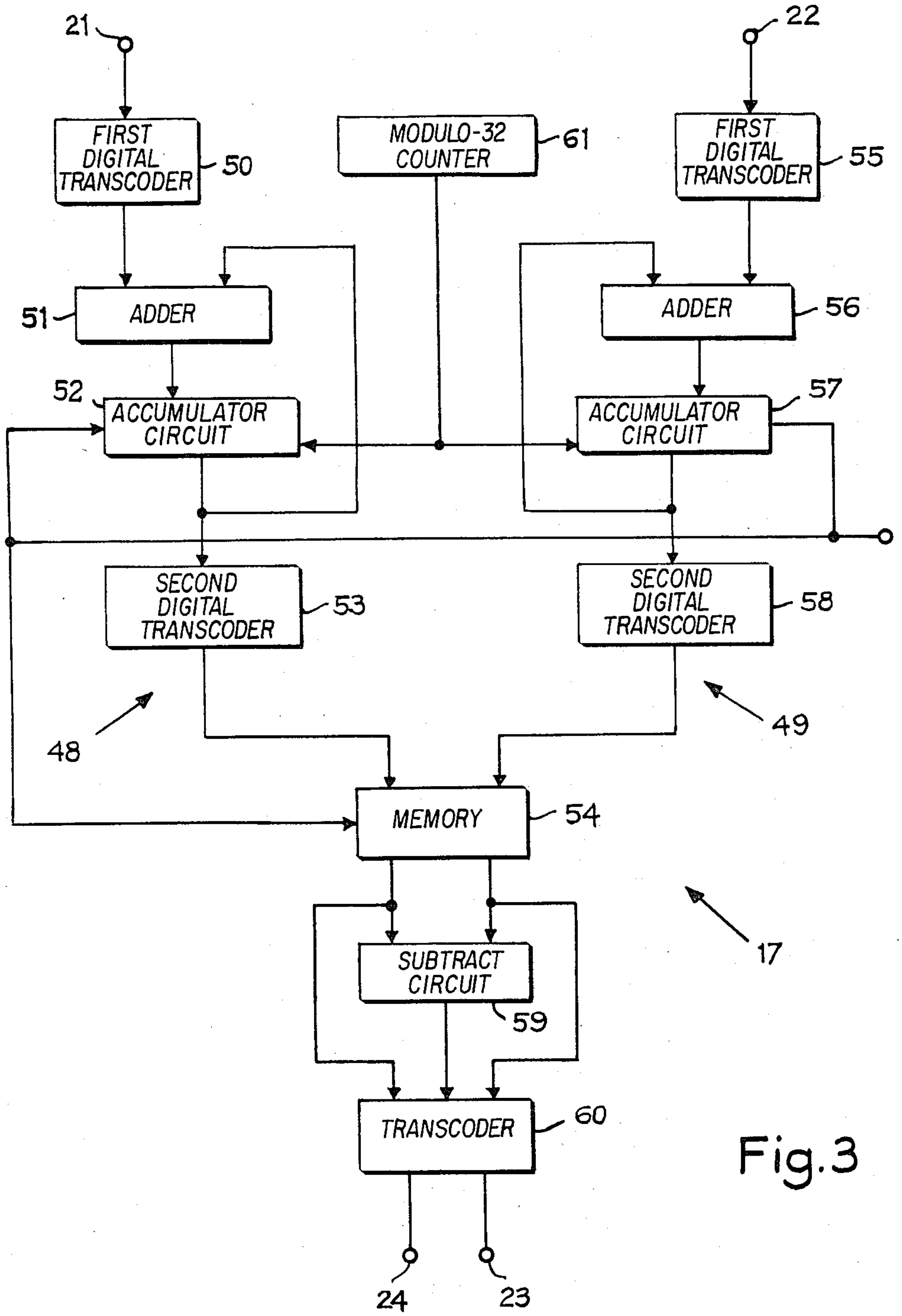
FIG. 3 is a detailed block diagram of the decision logic circuit in FIG. 1.

The decision logic circuit 17 shown in detail in FIG. 3 comprises from its inputs 21 and 22 identical input circuits 48 and 49. Input circuit 48 comprises from input 21 a first digital transcoder 50 for transcoding (the digital value appearing in logarithmic so-called PCM form)/(square of the value presented in linear digital form), an adder 51 of which a first input is connected to the output of said transcoder, an accumulator circuit 52 connected to the output of the adder, and a second digital transcoder 53 connected to the output of the accumulator circuit 52 for linear-to-logarithmic transcoding, the output of the accumulator circuit also being connected to the second input of adder 51. The output of the second transcoder 53 is connected to the first input of a memory 54.

The second input circuit 49 of the decision logic circuit is connected to the second input of memory 54 and comprises the same components as input circuit 48, identified by the numbers 55 to 58.

The two outputs of memory 54, corresponding respectively to its two inputs, are connected to the corresponding inputs of a subtract circuit 59 and also to the corresponding inputs of a transcoder 60. The output of the subtract circuit 59 being connected to a third input of transcoder 60, whose function is explained below. The two outputs of transcoder 60 constitute outputs 23 and 24 of the decision logic circuit 17.

In addition, decision logic circuit 17 also possesses a modulo-32 counter 61 synchronized with counter 29 of the circuit in FIG. 2, and whose output is connected to the resetting inputs of the accumulator circuits 52 and 57. Finally, the addressing inputs of the accumulator circuits 52 and 57 and of memory 54 are all connected to a terminal 62, which is itself connected to counter 29 of the circuit in FIG. 2.

The following describes the operation of the echo canceler in accordance with the invention, with reference to FIGS. 1 to 3. Since the terminator, such as terminator 1, in each channel considered is not perfect, the incident data obtained from terminal 3 produce a certain reflected signal in the transmit channel leaving terminator 1. In order to eliminate the echo produced in this manner in the transmit channel, the echo canceler 11 multiplexed for each of the transmission channels considered is connected in parallel with all the terminators between the receive channel and the transmit channel of the 4-wire circuit. Digital filter 16 of echo canceler 11 is designed to synthesize a signal reproducing as closely as possible the echo signal from the terminator considered, this echo signal being, depending on the case, superimposed on the data obtained from the 2-wire circuit.

If a receive signal appears on terminal 3 and if no transmit signal is obtained from the 2-wire circuit, the subtract circuit 19 is fed with the signal synthesized by digital filter 16 and the echo signal due to terminator 1. The residual echo appearing on the output of the subtract circuit 19 is fed to filter 16 as an error signal and also to the transmit channel leaving on terminal 5. In addition, logic circuit 17, which as explained below compares the transmit and receive signals and controls the convergence factor of filter 16 as well as switch 10, determines that the received signal level is considerably greater than that of the signal obtained from terminator 1 and comprises only the echo. Consequently, logic circuit 17 adjusts the convergence rate of filter 16 to its optimum value and changes or holds switch 10 in the position shown in the drawing.

If a transmit signal obtained from the 2-wire circuit is then superimposed on the echo due to terminator 1 (so-called "double speech" operation), logic circuit 17 maintains switch 10 in the position shown in the drawing as long as the level of the signal from terminator 1 is not considerably higher than the level of the receive signal, and consequently modifies the convergence rate of filter 16 which, although fed on its input 20 with the transmit signal in addition to the residual echo, can still converge, but more slowly than in the previous case, since correlation between the transmit signal and the receive signal is generally very small.

As soon as there is no further receive signal and a transmit signal only exists, logic circuit 17 places switch 10 in the state opposite that shown in the drawing.

It should be noted that by applying a signal produced by a manual device or by a computer as a function of external events or of a program to control terminal 26, switch 10 can be forced to a predetermined state.

The following describes the operation of digital filter 16, referring to FIG. 2.

Let T be the sampling period for the receive signals appearing in each of the 32 time slots of the receiver channel. Since echo suppressor operation is time-shared between the 32 channels, it must synthetize the samples of its output signal in a time of less than T/32 seconds for each channel, i.e. approximately 3.9 $\mu$s for 8 kHz signal sampling as is the case for PCM telephony.

Consider an instant $t_1=(n+1)T$, n being any whole number.

Let the samples appearing at sampling instant mT on channel i relating to the receive signal, echo and output signal of memory 33 be represented by $x_i(mT)$, $y_i(mT)$ and $\epsilon_i(mT)$ respectively.

Assume that at said instant $t_1=(n+1)T$ the channel addressing counter 29 has just changed to value 0 corresponding to the first of the 32 channels processed, that counters 30 and 31 are both at address 15 and that samples $x_0[(n+1)T]$ and $y_0[(n+1)T]$ appear on terminals 3 and 14 respectively, $y_0[(n+1)T]$ being the echo from the terminator corresponding to said first channel at instant $t_1$.

The following delayed discrete values are found at addresses 15, 14 . . . 1 and 0 in page 0 of the delayed discrete value memory $\mathbf{34_1}$ and $\mathbf{34_2}$:

for $\mathbf{34_1}$: $x_0[(n-15)T]$, $x_0[(n-14)T]$, . . . $x_0[(n-1)T]$, $x_0[nT]$ for $\mathbf{34_2}$: $x_0[(n-31)T]$, $x_0[(n-30)T]$, . . . $x_0[(n-17)T]$, $x_0[(n-16)T]$ The following coefficients are found at addresses 15, 14 . . . 1 and 0 in page 0 of the coefficient memories $\mathbf{41_1}$ and $\mathbf{41_2}$:

for $\mathbf{41_1}$: $a_0^{15}(nT)$, $a_0^{14}(nT)$ . . . $a_0^{1}(nT)$, $a_0^{0}(nT)$ for $\mathbf{41_2}$: $a_0^{31}(nT)$, $a_0^{30}(nT)$ . . . $a_0^{17}(nT)$, $a_0^{16}(nT)$ since all the coefficients depend on the previous sampling instant since they are controlled. Their suffix 0 indicates that they correspond to page 0, and their exponent indicates their address.

Operation of processing modules 27 and 28 may be divided into a set of 18 successive phases for each processed channel and for each sampling instant.

PHASE 1

At instant $t_1$, the appropriate sequential control device (not shown and hereinafter known as the "sequencer") applies a clock pulse to buffer registers $\mathbf{36_1}$ and $\mathbf{36_2}$ and then to terminals $\mathbf{45_1}$ and $\mathbf{45_2}$. It should be noted that this sequencer produces all the clock signals required by the various components of the echo suppressor, including counters 29 to 31. These clock pulses control the loading of the following values into the operand input and multiplier registers of the multipliers-accumulators $\mathbf{38_1}$ and $\mathbf{38_2}$: $x_0[(n-15)T]$, $\epsilon_0(nT)$ and $x_0[(n-31)T]$, $\epsilon_0(nT)$ respectively.

It should be noted that the error signal sample $\epsilon_0(nT)$ entered from memory 33 into the multiplier input registers of $\mathbf{38_1}$ and $\mathbf{38_2}$ relates to the sampling instant nT, i.e. to the sampling instant preceding the considered sampling instant $t_1=(n+1)T$, since the error signal can be produced only from samples of the receive signal and corresponding echo signal already processed. As seen below, the error signal sample is available in a time less than T/32 seconds, implying that this error signal sample is always available when the delayed discrete value on which this error signal operates and in place of which is written the sample appearing at instant $t_1$ for the same channel, as explained below, appears on the input of multiplier-accumulator $\mathbf{38_1}$ or $\mathbf{38_2}$.

Said sequencer ther applies a write order or pulse to terminal $35_2$, which orders writing of the value $x_0[(n-15)T]$ available on the output of buffer register $36_1$ into address 15 in page 0 of memory $34_2$.

A write order is then applied by the sequencer to terminal $35_1$, which orders writing of the value $x_0[(n+1)T]$ appearing on the input of memory $34_1$ into address 15 in page 0 of memory $34_1$.

PHASE 2

Counter 30, always operating in the count-down mode, reaches the value 14. As indicated above, the delayed discrete values $x_0[(n-14)T]$ and $x_0[(n-39)T]$ are found at address 14 of memories $34_1$ and $34_2$ respectively. These two values are available on the respective outputs of the two said memories.

The sequencer then applies a clock pulse to terminals $46_1$ and $46_2$. This clock pulse orders memorization in the output registers of multipliers-accumulators $38_1$ and $38_2$ of the products obtained by multiplying together the contents of their respective inputs registers, i.e. $\epsilon_0(nT)\cdot x_0[(n-15)T]$ and $\epsilon_0(nT)\cdot x_0[(n-31)T]$ respectively. These values reach registers $39_1$ and $39_2$ respectively, where they are multiplied by the variable coefficient λ. This coefficient λ operates on the convergence rate of the digital filter and depends on the respective levels of the transmit signal and receive signal, as explained below.

The sequencer then sends a clock pulse to buffer registers $36_1$ and $36_2$, and then to terminals $45_1$ and $45_2$. These pulses order memorization in the operand input registers of multipliers-accumulators $38_1$ and $38_2$ of the values $x_0[(n-14)T]$ and $x_0[(n-30)T]$ respectively, which are available on the outputs of memories $34_1$ and $34_2$ respectively, as indicated above. It should be noted that since counter 26 remains at value 0 during the first 18 phases described herein, corresponding to page 0 of the memories it is required to address, including in particular memory 33, the value $\epsilon_0(nT)$ is constantly available on the output of memory 33, and therefore on the input of the operator input registers of multipliers-accumulators $38_1$ and $38_2$.

In addition, the coefficient memories $41_1$ and $41_2$ are addressed by counters 29 and 31, and are therefore at address 15 in page 0. The outputs of memories $41_1$ and $41_2$ thus produce coefficients $a_0^{15}(nT)$ and $a_0^{31}(nT)$ respectively. The sequencer then sends a clock pulse to buffer register $42_1$ and $42_2$. Said coefficients are thus applied to one of the inputs of adders $40_1$ and $40_2$. At the same time, the sequencer sends a pulse to registers $39_1$ and $39_2$, which therefore apply to the other input of each adder $40_1$ and $40_2$ the values $\lambda\cdot\epsilon_0(nT)\cdot x_0[(n-15)T]$ and $\lambda\cdot\epsilon_0(nT)\cdot x_0[(n-31)T]$ respectively. The following values are therefore obtained on the outputs of adders $40_1$ and $40_2$ respectively:

$$a_0^{15}(nT)+\lambda\cdot\epsilon_0(nT)\cdot x_0[(n-15)T]$$

and $$a_0^{31}(nT)+\lambda\cdot\epsilon_0(nT)\cdot x_0[(n-31)T].$$

These two values are equal to $a_0^{15}[(n+1)T]$ and $a_0^{31}[(n+1)T]$ respectively, since they are applied to the inputs of the coefficient memories $41_1$ and $41_2$ respectively for writing in subsequently in place of coefficients $a_0^{15}(nT)$ and $a_0^{31}(nT)$ respectively, where they become available for the processing corresponding to the sampling instant $t_2=(n+2)T$ for channel 0, this processing being divided into a next group of 18 phases similar to those described herein.

The sequencer then applies a clock pulse to terminals $43_1$ and $43_2$ of the input registers of multipliers-accumulators $37_1$ and $37_2$ respectively. This pulse orders memorization of the following values in the corresponding input registers:

for the operator and operand input registers of $37_1$: $a_0^{15}[(n+1)T]$ and $x_0[(n-14)T]$ for the operator and operand input registers of $37_2$: $a_0^{31}[(n+1)T]$ and $x_0[(n-30)T]$.

The sequencer then applies a write order to terminals $47_1$ and $47_2$ ordering memorization of coefficients $a_0^{15}[(n+1)T]$ and $a_0^{31}[(n+1)T]$ at addresses 15 in pages 0 of memories $41_1$ and $41_2$ respectively.

Counter 31 then progresses to address 14.

PHASE 3

Counter 30 progresses to address 13. Addresses 13 in pages 0 of memories $34_1$ and $34_2$ contain the delayed discrete values $x_0[(n-13)T]$ and $x_0[(n-29)T]$ respectively, these values therefore appearing on the outputs of said memories.

The sequencer then applies a clock pulse to terminals $46_1$ and $46_2$ of the output registers of multipliers-accumulators $38_1$ and $38_2$ respectively, such that these registers memorize the following multiplication products respectively: $\epsilon_0(nT)\cdot x_0[(n-14)T]$ and $\epsilon_0(nT)\cdot x_0[(n-30)T]$.

The sequencer then applies a clock pulse to buffer registers $36_1$ and $36_2$, and then to terminals $45_1$ and $45_2$ of the input registers of multipliers-accumulators $38_1$ and $38_2$, which therefore memorize $x_0[(n-13)T]$ and $\epsilon_0(nT)$ for the registers of $38_1$ and $x_0[(n-29)T]$ and $\epsilon_0(nT)$ for the registers of $38_2$. The coefficient memories $41_1$ and $41_2$ are still at address 14 in pages 0, with the result that their outputs produce the values $a_0^{14}(nT)$ and $a_0^{30}(nT)$ respectively. The sequencer then sends a clock pulse to buffer registers $42_1$ and $42_2$, and said output values of memories $41_1$ and $41_2$ appear on the first inputs of adders $40_1$ and $40_2$ respectively. At the same time, the sequencer sends a clock pulse to registers $39_1$ and $39_2$, and the following values:

$$\lambda\cdot\epsilon_0(nT)\cdot x_0[(n-14)T]=a_0^{14}[(n+1)T],$$

and $$\lambda\cdot\epsilon_0(nT)\cdot x_0[(n-30)T]=a_0^{30}[(n+1)T]$$

appear on the second inputs of adders $40_1$ and $40_2$ respectively. The sequencer then applies a clock pulse to terminals $43_1$ and $43_2$, and the values $a_0^{14}[(n+1)T]$ and $x_0[(n-13)T]$ are memorized in the input registers of multiplier-accumulator $37_1$, whilst the values $a_0^{30}[(n+1)T]$ and $x_0[(n-29)T]$ are memorized in the input registers of multiplier-accumulator $37_2$.

The sequencer than applies a write order to terminals $47_1$ and $47_2$, and the coefficients $a_0^{14}[(n+1)T]$ and $a_0^{30}[(n+1)T]$ are memorized at addresses 14 in pages 0 of memories $41_1$ and $41_2$ respectively. Counter 31 then progresses to address 13.

PHASES 4 TO 17

The process described above for phases 2 and 3 is repeated in a similar manner for phases 4 to 17, with one exception noted below for phase 17, still for page 0, i.e. in general:

decrementation of counter 30 by 1;

memorization in the output register of each of the second multipliers-accumulators of the result of multiplying the value of the error signal sample relative to the sampling instant preceding the sampling instant considered by the delayed discrete value read in the corresponding delayed discrete value memory during the previous phase;

memorization in the two input registers of each of the second multipliers-accumulators of the delayed discrete value read in the corresponding memory address whrich has just been addressed by counter 30, and of the same value of the error signal sample respectively;

addition of said multiplication result, itself multiplied by the corresponding factor λ, and the value of the corresponding coefficient relating to the sampling instant preceding the sampling instant considered;

memorization in the two input registers of each of the first multipliers-accumulators of the result of the addition just performed, and of the delayed discrete value which has just been addressed by counter 30 respectively;

memorization in the corresponding coefficient memory of said addition result at the address of the coefficient just used;

decrementation of counter 31 by 1.

The only exception to this repetitive process concerns the seventeenth phase, for which counters 30 and 31 are initialized at the value 15, since they operate in the count-down mode.

PHASE 18

Counter 30 remains on address 15. The sequencer applies a pulse on terminals $44_1$ and $44_2$ for the output registers of multipliers-accumulators $37_1$ and $37_2$, which represent the values $Z_{1,0}[(n+1)T]$ and $Z_{2,0}[(n+1)T]$ respectively. The first suffix of value Z is that relating to the order number of the corresponding processing module of which Z is the output value for the sampling instant considered, and the second suffix of value Z corresponds to the page or the channel considered, i.e. channel 0.

The above values of Z are equal to:

$$Z_{1,0}[(n+1)T] = = a_0^{15} \cdot x_0[(n-14)T] + a_0^{14} \cdot x_0[(n-13)T] + \ldots + a_0^{1} \cdot x_0(nT) + a_0^{0} \cdot x_0|(n+1)T|$$

and $$Z_{2,0}[(n+1)T] = a_0^{31} \cdot x_0[(n-30)T] + a_0^{30} \cdot x_0[(n-29)T] + \ldots + a_0^{17} \cdot x_0[(n-16)T] + a_0^{16} \cdot x_0[(n-15)T].$$

The following value appears on the output of adder 32:

$$y_0^1[(n+1)T] = Z_{1,0}[(n+1)T] + Z_{2,0}[(n+1)T]$$

and, in general, if there are n identical processing modules:

$$y_0^1[(n+1)T] = Z_{1,0}[(n+1)T] + Z_{2,0}[(n+1)T] + \ldots Z_{n,0}[(n+1)T].$$

The subtract circuit 19 subtracts from the echo sample $y_0[(n+1)T]$ appearing on terminal 14 the value $y_0^1[(n+1)T]$ synthesized by the set of processing modules of the digital filter. The result of the subtraction is $\epsilon_0[(n+1)T]$ and is stored at address 0 of memory 33 (memory 33 being at address 0, since counter 29 has remained at address 0), in place of the older value $\epsilon_0(nT)$, which has just been used as described above.

The value $\epsilon_0[(n+1)T]$ naturally appears on terminal 15, and after being converted by converter 9 is fed to terminal 5, superimposed with any transmit signal sample of the corresponding channel provided switch 10 is in the position shown in the drawing. When the echo suppressor in accordance with the present invention has converged, the value $\epsilon_0[(n+1)T]$ is very small compared with a normal transmit signal sample, which is therefore practically undisturned.

Still in the course of phase 18, the sequencer sends a resetting pulse to a corresponding terminal (not shown) of multipliers-accumulators $37_1$ and $37_2$, which are reset to zero.

PROCESSING OF THE FOLLOWING CHANNELS

Counter 29 then progresses to value 1, and processing identical with that described in 18 phases above starts again, except that obviously pages 1 of memories $34_1$, $34_2$, $41_1$, $41_2$ and 33 are selected, counters 30 and 31 starting at the value 15. This same processing is repeated for the other channels processed up to channel 31.

For channel 31, the processing described above is repeated, but during the eighteenth phase, counter 30, instead of remaining at value 15, decrements by 1, thus changing to value 14, whilst counter 31 remains at value 15.

Finally, counter 29 progresses to value 0, and at the instant $t_2=(n+2)T$ upon the arrival of sample $x_0[(n+2)T]$, the processing described above and divided into a group of 18 successive phases is repeated, except that counter 30, initially at value 14, addresses in succession the sixteen delayed discrete values $x_0[(n-14)T]$, $x_0[(n-13)T]$, . . . , $x_0(nT)$ and $x_0[(n+1)T]$ in memory $34_1$, and the sixteen delayed discrete values $x_0[(n-30)T]$, $x_0[(n-29)T]$, . . . , $x_0[(n-16)T]$ and $x_0[(n-15)T]$ in memory $34_2$, the values $x_0[(n-14)T]$ and $x_0[(n-15)T]$ having become the oldest values in memories $34_1$ and $34_2$ respectively. Thus by simple decrementation of counter 30 by 1, requiring only one clock pulse during the eighteenth phase of the last channel processed, a fictive shift operation is performed on the sixteen delayed discrete values in the corresponding memory. In addition, by means of the simultaneous operation of the processing modules in parallel, a very large number of delayed discrete values can be processed in a very short time.

Tests have shown that if the delay discrete values are represented by 16 bits, for example, it merely necessary to define the correction coefficients (on the outputs of the second multipliers-accumulators and in the coefficient memories) by only 24 bits, the 16 most significant bits only being sent to the first multipliers-accumulators, to attenuate the echo by more than 70 dB.

Finally, the following describes the operation of the decision logic circuit 17 shown in detail in FIG. 3.

The samples $x_i(mT)$ and $y_i(mT)$ appearing on terminals 21 and 22 are transcoded by transcoders 50 and 55 respectively, which apply the values $x_i^2(nT)$ and $y_i^2(nT)$ on the corresponding inputs of adders 51 and 56 respectively. The other inputs of adders 51 and 56 are fed with the partial accumulation results $\Sigma x_i^2(mT)$ and $\Sigma y_i^2(mT)$ obtained on the outputs of the accumulation circuits 52 and 53 respectively. Adders 51 and 56 feed circuits 52 and 57 with the new accumulation results. Each time 32 values have been accumulated in the accumulator circuits 52 and 57, the accumulation results are converted logarithmically, in decibels for example, by transcoders 53 and 58 respectively, whose outputs produce signals $NE_i$ and $NR_i$ respectively, corresponding to the speech level on the channel i considered for the receive and transmit directions. Memory 54 stores the values of $NE_i$ and $NR_i$ expressed, for example, in decibels for each of the 32 channels. Counter 61 then resets the accumulator circuits 52 and 57 channel by channel.

During the addressing of each of the channels of memory 54, the corresponding values of $NE_i$ and $NR_i$ are fed to the subtract circuit 59, which immediately applies the difference between these values (i.e. the ratio of the corresponding values expressed in linear form) to the input of transcoder 60, which is also fed directly with values $NE_i$ and $NR_i$ from memory 54.

Transcoder 60 is programmed to produce appropriate control signals on terminals 23 and 24 as a function of the values $NE_i$, $NR_i$ and $NE_i-NR_i$. Transcoder 60 may, for example, be programmed as follows, firstly considering the case of no signal in the receive direction of the channel processed, and then the case of a signal present on this same channel.

(1) Absence of Signal: In this case, $NR_i$ is less than $-50$ dB. The signal appearing on terminal 23 acts on registers $39_1$ and $39_2$ for obtaining a factor $\lambda=0$, i.e. resetting of the register contents to zero. The signal appearing on terminal 24 is such that it places switch 10 in the position opposite that shown in the drawing, i.e. it disconnects output 15 of the echo suppressor and the output of converter 8 is connected directly to the input of converter 9.

(2) Presence of Signal: In this case, $NR_i$ is generally greater than $-50$ dB. The signal produced by transcoder 60 on terminal 23 and acting on factor $\lambda$ has a value which depends on the difference $NR_i-NE_i$. Factor $\lambda$ increases with the algebraic value of the difference $NR_i-NE_i$. Between the extreme values of $\lambda$, transcoder 60 is programmed experimentally such that factor $\lambda$ is best adapted to the relative levels of the input signal. The signal applied by transcoder 60 to terminal 24 is such that it places switch 10 in the position opposite that shown in the drawing when, for example, $NR_i$ and $NE_i$ are of the same order.

In conclusion, the processing method in accordance with the present invention enables a large number of transmit channels to be processed in shared time by means of fictive shifting of the contents of each delayed discrete value memory, this operation being performed with a correction adapting as quickly as possible to the instantaneous operating conditions of the system to which it is applied. In the case of application to an echo suppressor, this process ensures optimum operation for both single and double speech by a control loop following as closely as possible the relative levels of the transmit and receive channels. The digital filter in accordance with the present invention is small in size and relatively simple to produce because of its division into identical processing modules with common addressing and each of very small dimensions. In addition, this digital filter has extremely good attenuation characteristics for eliminating the "operand" signal.

Obviously, numerous modifications and variations of the present invention are possible in light of the above teachings and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the shared-time processing of digital signals by synthesizing from an incident signal a digital signal which approximates an "operand" digital signal, comprising the following steps for each channel processed and for each sampling instant:

a. producing said incident signal;

b. producing said operand signal resulting from said incident signal;

c. memorizing a series of consecutive digital samples of said incident signal;

d. determining the number of said digital samples from said incident signal;

e. linearly transcoding said incident signal to a linear digital form;

f. producing said synthesized signal from said incident signal;

g. producing an error sample signal as a result of a comparison of said synthesized signal and said operand digital signal for each of said samples;

h. first multiplying by the value of a previously produced error sample signal the oldest sample of said series since the arrival of a first considered sample of said incident signal;

i. secondly multiplying the result of said multiplication of said sample of said series and said previously produced error sample signal by a corrective factor in a second multiplication;

j. adding the result of said second multiplication to a first coefficient of a series of coefficients corresponding to said series of samples and outputting a new coefficient;

k. substituting said new coefficient for a said first coefficient;

l. multiplying the value of the sample immediately following said oldest sample by the result of said addition;

m. repeating the steps h through l for all other samples of said series of samples taken in order of decreasing age, adding each time the result of the last multiplication of the process considered to the result memorized during the previous process;

n. memorizing the sum of said two results;

o. producing an error signal sample equal to the difference between a final sum produced by the result of the last multiplication and the memorized sum of the results of all the last multiplications that have been obtained from the most recent sample of said series;

p. producing the corresponding sample of the channel corresponding to the operand digital signals;

q. memorizing said error sample signal for subsequent use upon arrival of the sample immediately following the first sample of the incident signal;

r. writing the first sample of said series considered in place of the oldest sample considered of said series;

s. repeating each of the above steps for each channel to be processed.

2. The method according to claim 1 further comprising for each channel processed and for each sampling instant having the same number of consecutive digital samples, the additional steps of;

memorizing the oldest sample of the first series immediately succeeding the most recent sample of the second series whose oldest sample immediately succeeds the most recent sample of the third series, and so on up to the last series, wherein for each channel the different adjacent series are simultaneously processed;

obtaining the error signal sample of each channel by adding said final sums and the difference between the total of said final sums and the sample corresponding to the channel corresponding to the "operand" digital signal is determined;

writing-in place of the oldest sample of the last series, the oldest sample of the next-to-last series;

writing-in place of the oldest sample of the next-to-last series the oldest sample of the series immediately before the next-to-last series;

continuing said writing-in and procedure until reaching the first series in which said first sample considered is written in place of the oldest sample which has formerly been written in place of the oldest sample of the second series.

3. A process in accordance with claim 1 or 2, further comprising the step of determining said corrective factor as a function of all the possible values of the ratios between the incident signal levels and the "operand" signal level of the channel considered.

4. In a digital filter for use in the share-time processing of digital signals for synthesizing from an incident signal a digital signal by approximating an "operand" digital signal, the improved apparatus comprising:

a convergence rate control circuit having an input for receiving said operand signal;

a pcm to linear digital convertor for converting said operand signal to a linear form of digital signals;

a processing circuit connected to the output of said convergence rate control circuit and having a first input circuit means for receiving said incident signal and a second input circuit means;

a subtract circuit having a first input for receiving digital samples in linear form of said operand signal output from said pcm to linear digital convertor and a second input for receiving the output of said processing circuit with the output of said subtract circuit being fed to said second input circuit means of said processing circuit;

a switch means whose first input is connected to the output of said subtract circuit and whose second input receives digital samples in linear form of said operand signal and whose output constitutes the output channel of said digital filter wherein said second input circuit means of said processing circuit comprises a difference memory whose input is connected to the output of said subtract circuit and whose output is connected to an error signal input of said processing circuit wherein said processing circuit comprises at least one processing module with each processing module comprising a delayed discrete value memory, a first multiplier-accumulator having a first input connected to the output of said discrete value memory, a second multiplier-accumulator having a first input connected to the output of said discrete value memory with the second input of said second multiplier-accumulator being connected to the output of said difference memory, a shift register whose input is connected to the output of said second multiplier-accumulator;

each said processing circuit further comprising a summing circuit having a first input connected to the output of said shift register, a coefficient memory whose input is connected to the output of said summing circuit and whose output is connected to the second input of said summing circuit with the second input of said first multiplier-accumulator being connected to the output of said summing circuit with the output of said first multiplier-accumulator being the output of said processing module.

5. A digital filter as claimed in claim 4 wherein said processing circuit comprises a plurality of processing modules with the input of said delayed discrete value memory of the second of said plurality of modules and the delayed discrete value memory of each of the remaining modules of said plurality of modules are simultaneously connected to the output of the delayed discrete value memory of each of the immediately preceding modules; and adder means having inputs connected to the outputs of the various processing modules and an output constituting the output of the processing circuit which is connected to said subtract circuit.

6. A digital filter according to claim 4 or 5 wherein said convergence rate control circuit includes a first input connected to receive said incident signal, a second input connected to receive digital signals in logarithmic form of the "operand" signal and a first output connected to said processing circuit and wherein said convergence rate control circuit incldes two input circuits each connected to one of its two inputs and each comprising a first digital transcoder, the input of the first transcoder constituting the corresponding input of said control circuit, an adder of which a first input is connected to the output of said first transcoder, an accumulator circuit whose input is connected to the output of said adder and a second digital transcoder for linear-to-logarithmic transcoder whose input is connected to the output of said accumulator circuit, and whose output constitutes the output of the corresponding input circuit, wherein said convergence rate control circuit comprises in addition a memory with two inputs, each connected to the output of one of said input circuits, said convergence rate control circuit further including a third transcoder having inputs directly connected to the corresponding output of said additional memory said additional memory further having an output connected to a third input of said third transcoder through a second subtract circuit with said third transcoder having two outputs constituting the outputs of the convergence rate control circuit and with said third transcoder generating on its first output a signal at several levels as a function of the relative values of its input levels and generating at its second output a two-level signal as a function of the relative values of its input signals.

* * * * *